(12) United States Patent
Hartung

(10) Patent No.: US 8,628,058 B2
(45) Date of Patent: Jan. 14, 2014

(54) SHUT-OFF VALVE FOR PLUMBING APPLICATIONS

(75) Inventor: Karl-Heinz Hartung, Attendorn (DE)

(73) Assignee: Viega GmbH & Co. KG, Attendorn (DE)

( * ) Notice: Subject to any disclaimer, the term of this patent is extended or adjusted under 35 U.S.C. 154(b) by 954 days.

(21) Appl. No.: 12/403,393

(22) Filed: Mar. 13, 2009

(65) Prior Publication Data
US 2009/0256097 A1 Oct. 15, 2009

(30) Foreign Application Priority Data
Apr. 10, 2008 (DE) .................. 10 2008 018 507

(51) Int. Cl.
*F16K 5/06* (2006.01)
*F16K 5/00* (2006.01)

(52) U.S. Cl.
USPC .. 251/315.16; 251/314; 251/316; 251/317.01

(58) Field of Classification Search
USPC ............... 251/315.01–315.16, 314, 316, 317, 251/317.01
See application file for complete search history.

(56) References Cited

U.S. PATENT DOCUMENTS

| | | | |
|---|---|---|---|
| 3,679,170 A * | 7/1972 | Bernas et al. ................ | 251/104 |
| 3,689,027 A * | 9/1972 | Grenier ................... | 251/315.16 |
| 3,737,145 A * | 6/1973 | Heller et al. ................ | 251/309 |
| 3,819,150 A | 6/1974 | Kajrup | |
| 3,961,405 A | 6/1976 | Robinson | |
| 3,966,119 A | 6/1976 | Harter et al. | |
| 4,150,810 A * | 4/1979 | Laignel et al. ................ | 251/309 |
| 4,180,244 A * | 12/1979 | Rosenitsch ................... | 251/309 |
| 4,257,576 A * | 3/1981 | Legris ...................... | 251/315.08 |
| 5,975,128 A | 11/1999 | Schatz | |
| 6,173,940 B1 | 1/2001 | Kardohely et al. | |
| 6,899,599 B1 | 5/2005 | Hsiang-Hui | |

FOREIGN PATENT DOCUMENTS

| | | |
|---|---|---|
| DE | 2235557 | 2/1973 |
| DE | 2365926 | 2/1977 |
| DE | 2365926 A1 | 2/1977 |
| DE | 19500475 | 7/1996 |
| DE | 19500475 | 9/2001 |
| DE | 202006001292 | 5/2006 |
| EP | 0222314 | 5/1987 |
| FR | 1171525 | 1/1959 |
| FR | 1171525 A | 1/1959 |
| GB | 926750 | 5/1963 |
| GB | 1067419 | 5/1967 |

* cited by examiner

*Primary Examiner* — Justin Jonaitis
(74) *Attorney, Agent, or Firm* — Rankin, Hill & Clark LLP

(57) ABSTRACT

A shut-off valve for plumbing applications for shutting off a duct through which a fluid can flow, includes at least two connection fittings forming a housing, which define a flow path when assembled; and a shut-off body rotatably disposed in the housing, which includes at least two shut-off sections. The shut-off body is movable between a closed position, in which at least one of the shut-off sections of the shut-off body blocks the flow path, and an open position, in which both shut-off sections open the flow path. In order to reduce manufacturing complexity, the shut-off body is formed from a formed sheet metal component.

10 Claims, 1 Drawing Sheet

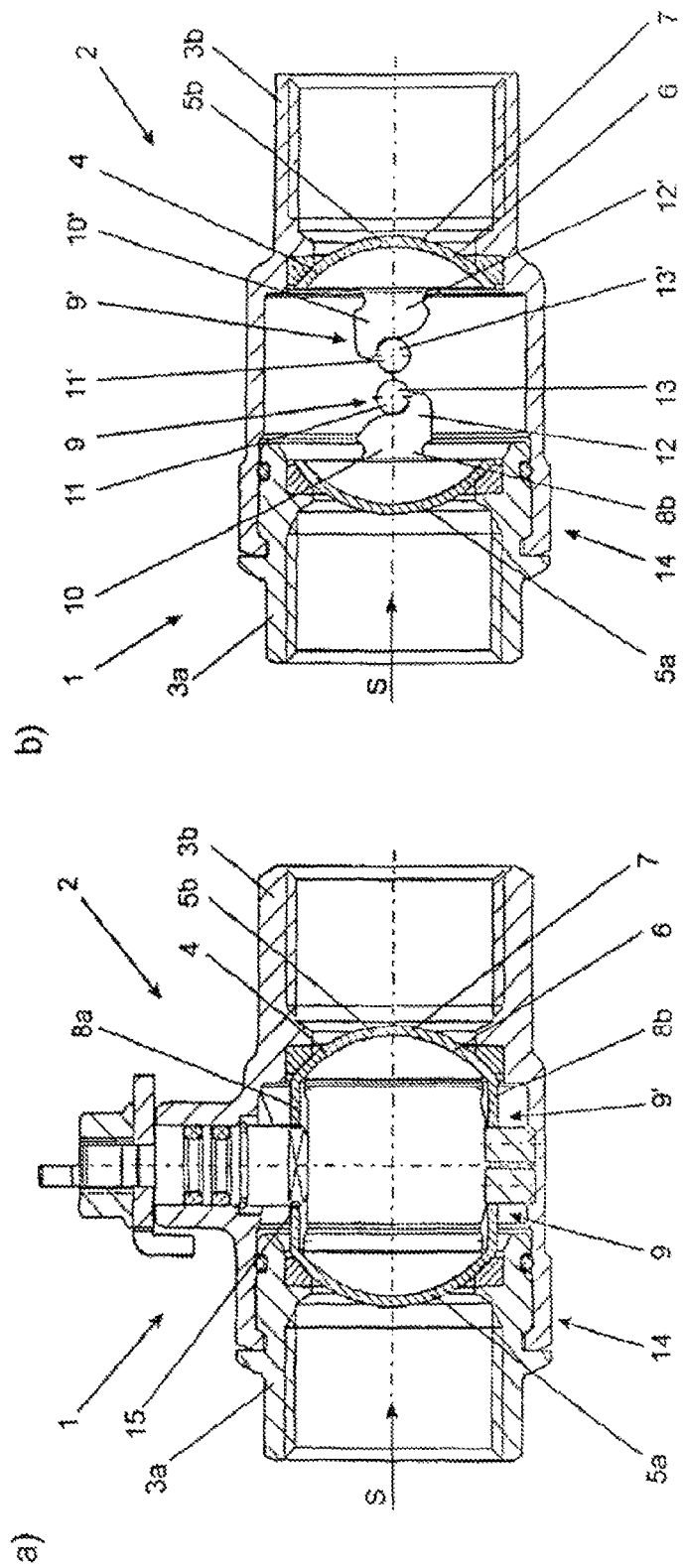

SHUT-OFF VALVE FOR PLUMBING APPLICATIONS

FIELD OF THE INVENTION

The present invention relates to a shut-off valve for plumbing applications for shutting off a duct through which a fluid can flow, which shut-off valve comprises at least two connection fittings forming a housing, which define a flow path in assembled state, and which shut-off valve comprises a shut-off body rotatably supported in the housing with at least two shut-off sections, wherein the shut-off body is movable between a closed position, in which at least one of the shut-off sections of the shut-off body blocks the flow path, and an open position in which both shut-off sections open the flow path.

BACKGROUND OF THE INVENTION

Shut-off valves as recited before, in particular a ball-, cylinder- or cone valve have been known for a long time and are used in various technical applications in different sizes. Two-channel- and multichannel shut-off valves are known.

The housing of the shut-off valve is typically assembled from two connection fittings, which are screwed together or glued together. The connection fittings are used for connecting the shut-off valve to a duct, through which a fluid can flow. The connection of the duct sections to the connection fittings can be performed by threading them in, by welding them on or by pressing them in.

Through an actuation element, which can be driven e.g. mechanically, electrically, pneumatically, electromagnetically or hydraulically, a shut-off body within the housing of the shut-off valve is rotated perpendicular to the flow path. The shut-off valve with one of its sections closes the flow channel in the closed position of the shut-off valve by the shut-off section blocking the flow path. By rotating the shut-off body through the actuation element into an open position, the shut-off sections of the shut-off body open the flow path.

The shut-off body can be configured ball shaped, cone shaped or cylinder shaped and can be comprised of a body made of solid material, in case of a spherical shut-off body, it can be comprised of a solid sphere with a pass-through bore hole.

The solid body is thus turned on a lathe from a blank, typically a cylinder, whose diameter corresponds at least to the final diameter at the widest location of the solid body to be produced, thus corresponds e.g. to the diameter of the solid sphere. Thus, a relatively large portion of the blank has to be turned down, which increases the fabrication labor required. Additionally, there is more complexity involved in fabricating the pass-through bore hole.

SUMMARY OF THE INVENTION

Thus, it is the object of the present invention to provide a shut-off valve which assures reduced production complexity.

The object derived and described before is achieved according to a first teaching of the present invention through a shut-off valve of the type described before, wherein the shut-off body is configured by a formed sheet metal component.

By using a formed sheet metal component instead of a solid body, e.g. instead of a solid sphere, the high complexity for machining on a lathe does not apply. Also, the high materials consumption in conjunction with machining, a large portion of the blank is turned down and is unutilized scrap, does not occur, since according to the invention in order to produce the shut-off body, a sheet metal component is only stamped out of a sheet metal blank and formed, which sheet metal component corresponds to the subsequent shut-off body, at least in sections. Thus, stamping and forming can be performed in sequence or preferably even in one single process step. Furthermore, said formed sheet metal component is already hollow from the beginning, so that when the stamped and formed sheet metal component is suitably formed with a respective recess, no pass-through bore hole has to be fabricated at all, or in case of a subsequent fabrication, the pass-through bore hole can be fabricated in a much simpler manner. The production of the shut-off body as a formed sheet metal component is thus less complex than the production from a solid body.

It is another advantage of a shut-off body configured by a formed sheet metal component, that an additional surface coating can be omitted. In case of a solid body, e.g. a solid sphere, it is still subsequently required by the machining process, to finish the surface, e.g. to polish it, or to coat it, in order to achieve an optimum sealing effect or optimum switching results.

According to an embodiment of the shut-off valve according to the invention, the formed sheet metal component is a spherical, conical or cylinder shaped component, at least in sections, wherein the shut-off sections are preferably completely bent. Put differently, any customary shape of a shut-off body can be made from a sheet metal blank. In case of a ball as a shut-off body, the shut-off sections, which close the connection fittings, and thus block the flow path, in order to shut off the duct through which the fluid flows, are spherically bent about a point. In case of a cylinder as shut-off body, the shut-off sections are bent cylindrically about an axis, and in case of a cone, they are conically bent about an axis. The bent shut-off sections assure that the shut-off sections evenly contact the inside of the connection fitting or seals disposed accordingly during a rotation of the shut-off body between the closed position and the open position.

According to an advantageous embodiment of the shut-off valve, the formed sheet metal component is a ball with at least one flattened section, in particular with at least two flattened sections, which are preferably disposed opposite to one another. One of the flattened sections can extend transversal to the rotation axis of the shut-off body and can comprise a recess, in which an actuation element engages in order to provide a torsionally rigid connection with the shut-off body. Such an actuation element can then be used in order to switch the shut-off body between the closed position and the open position. Another flattened section, which is opposed to the first flattened section, and which preferably also extends transversal to the rotation axis of the shut-off body, can be used as a component of a rotation limiter device, which is subsequently described in more detail. Thus, the flattened section can also comprise one or possibly plural recesses.

According to another embodiment of the shut-off valve of the invention, in the sheet metal component for the wall thickness at least of the shut-off sections, in particular the wall thickness of the entire formed sheet metal component, is constant. Thus, on the one hand, an even pressure distribution within the formed sheet metal component is assured, in particular within the shut-off sections in closed position, when the maximum fluid pressure impacts the shut-off body. On the other hand, an optimum flow through of the shut-off body is assured in open position.

As recited before, the formed sheet metal component configuring the shut-off body can be a component produced by stamping and forming, e.g. bending. It is feasible e.g. to produce a ball as a stamped and bent component in a progressive die. Thus, it is feasible to produce or assemble the sheet metal component from a single sheet metal blank or from plural formed components produced by stamping and bending. In particular, two formed components each forming half of the formed sheet metal component can be assembled to configure a shut-off body.

According to another configuration of the shut-off valve according to the invention, the shut-off body is provided with at least one rotation limiter device as discussed. The rotation limiter device exactly defines the closed position and/or the open position for the user when actuating the shut-off valve, i.e. when rotating the shut-off body. Thus, according to the invention, for the first time the rotation limiter device is a component of the shut-off body, and it is not pressed or cast as stop device into the housing as in the prior art any more. The stops formed on the outside of the housing so far have additionally increased the complexity for producing the shut-off valve, and furthermore posed the inherent risk of damaging the rotation limiter device, since the stops were unprotected.

Preferably, the rotation limiter device comprises a stop component, disposed at the shut-off body, and an opposite stop component, interacting therewith, disposed in the housing and limiting the rotation of the shut-off body. Thus, the stop component and/or the opposite stop component is integrally configured with the shut-off body or the housing, but it can also be subsequently formed. In particular, it is conceivable that the stop component is formed by a hook shaped sheet metal section, which is preferably an integral component of the shut-off body, thus integrally configured with the remaining formed sheet metal component. Said stop component can e.g. be an element of the flattened section recited before, and can be configured by one or plural recesses in this portion of the shut-off body. The opposite stop component can be formed by a protruding, in particular bolt shaped housing section, which is preferably an integral component of the housing, thus integrally configured therewith. Thus, the protruding or bolt shaped housing section can be disposed on the inside at the housing wall opposite to the opening provided in the housing for the actuation element. The opposite stop piece can also be a subsequently formed bolt, or another protrusion, which can be positioned in the housing as recited before.

The described stop component, in particular the hook shaped sheet metal section of the shut-off body, however, is not only used for limiting the rotation. In the closed position, furthermore, an increased pressure from the shut-off body is generated upon the seals in the housing through the contact of the stop component at the opposite stop component, in particular through the contact at the bolt shaped housing section. Said optimized pressure guarantees the tightness in closed position also long-term.

It is also feasible that plural rotation limiter devices are provided, wherein plural stop pieces interact accordingly with respective opposite stop components. When using plural rotation limiter devices, these are preferably disposed symmetrical, in particular disposed rotation symmetrical to the rotation axis of the stop body in the housing of the shut-off valve.

In order for the fluid flow to run as smoothly as possible through the shut-off valve in the open position, the stop piece and/or the opposite stop piece according to another embodiment does not reach into the flow path, thus it is preferably integrated into the housing, or it is integrated into the sheet metal component, so that it does not protrude beyond the inner surface of the formed sheet metal component.

According to yet another embodiment of the shut-off valve of the invention, the connection fittings are inserted into one another and pressed together in particular through cold forming. Though it is feasible in principle to screw the connector fittings together and/or to glue them together, wherein, however, pressing them together significantly reduces the manufacturing complexity and also the materials cost. The required tightness between the two connector fittings in the overlapping portion can be achieved through a seal element disposed in this portion, e.g. a seal ring, preferably an O-ring.

The object is furthermore accomplished according to a second teaching of the present invention in a shut-off valve of the type recited before, in particular a shut-off valve as described before, by assembling the formed sheet metal component from plural formed components produced through stamping and bending. Thus, the rotation limiter device can be preferably configured as described before in detail.

A shut-off valve for plumbing applications with such a rotation limiter device leads to significantly reduced manufacturing complexity, since the rotation limiter device is directly integrated into the shut-off body, and does not have to be formed on the outside of the housing in a separate process step. Furthermore, the rotation limiter device is better protected through its disposition in the interior of the housing of the shut-off valve.

Furthermore, according to a third teaching of the present invention, the object is eventually accomplished in a shut-off valve of the type recited before, in particular in a shut-off valve as described before, by inserting the connection fittings into one another and pressing them together in an overlapping portion, in particular through cold forming. Thus, in the overlapping portion between the connection fittings inserted into one another, in particular a seal element, preferably a seal ring, e.g. an O-ring, is disposed.

Such shut-off valve leads to a reduced manufacturing complexity, since, on the one hand, using expensive glue, which furthermore has to be applied in a separate process step, can be omitted. On the other hand, no thread has to be provided at the joint of the two connection fittings, i.e. in the overlapping portion, which would also require a separate process step.

Now, there is a plurality of possibilities to configure and improve the shut-off valve according to the invention. Reference is made, on the one hand, to the patent claims following claim 1; on the other hand, reference is made to the description of an example in conjunction with the drawing.

BRIEF DESCRIPTION OF THE DRAWINGS

FIG. 1(*a*) is a cross-sectional view of a shut-off valve according to the present invention;

FIG. 1(*b*) is a cross-sectional view of the shut-off valve according to the present invention rotated ninety degrees.

DESCRIPTION OF THE INVENTION

In the drawing, FIG. 1 shows a shut-off valve 1 for plumbing applications for shutting off a duct (not shown) through which a fluid can flow. The shut-off valve 1 comprises a housing 2, which is formed by two connection fittings 3*a* and 3*b*, which are pressed into one another in the present embodiment by cold forming in an overlapping portion 14. A seal ring 15 provided as an O-ring is used for sealing the interior relative to the ambient.

In the housing 2, a shut-off body 4 is rotatably disposed, which comprises two shut-off sections 5*a* and 5*b*. The shut-off body 4 can be moved between a closed position, which is illustrated in FIG. 1, and in which the shut-off sections 5*a* and 5*b* block the flow path S, and an open position, which is not shown, in which the shut-off sections 5*a* and 5*b* open the flow path.

In the present case, the shut-off body 4 is formed by a formed sheet metal component 6, thus by a ball 7 with two flattened sections 8a and 8b disposed opposite to one another. The formed sheet metal component 6 is a component with constant wall thickness produced through stamping and bending. The flattened sections are thus clearly visible in FIG. 1a).

The flattened section 8a illustrated in the upper section of FIG. 1a) comprises a recess 15, in which the actuation element engages torsionally rigid, by which actuation element the shut-off body 4 can be rotated from the illustrated closing position into the non-illustrated open position.

The flattened section 8b illustrated in the lower section of FIG. 1a) is an element of two rotation limiter devices 9 and 9', disposed in the lower portion of the shut-off valve 1, which are subsequently described with reference to FIG. 1b).

FIG. 1b) shows a cross section through the shut-off valve 1 rotated by 90° about the longitudinal axis relative to FIG. 1a). In this view, the configuration of the lower flattened section 8b of the formed sheet metal component 6 is illustrated. The flattened section 8b forms two stop components 10 and 10' disposed rotationally symmetrical relative to the rotation axis of the shut-off body 4, which stop components are formed as hook shaped sheet metal sections 12 and 12'. Two opposite stop components 11 and 11' interact with the stop components 10 and 10', which opposite stop components are provided as protruding bolt housing sections 13 and 13', so that the rotation about the housing axis of the shut-off body 4 is limited.

Besides a rotation limitation, the hook shaped sheet metal sections 12 and 12' also provide an increase of the sealing effect in the closed position. Thus, in the closed position through contact between the hook shaped sheet metal sections 12 and 12' with the bolt shaped housing sections 13 and 13', an optimum pressure from the shut-off body is imparted upon the seals. Said pressure assures tightness in closed position. In the open position, the pressure onto the seals is not mandatory, so that the hook shaped sheet metal sections 12 and 12' are only used for limiting the rotation in this case.

The two hook shaped sheet metal sections 12 and 12' are integral elements of the formed sheet metal component 6, and were also produced by stamping and bending, when producing the formed sheet metal component 6. After producing the connection fitting 3b, the bolt shaped housing sections 13 and 13' were welded on in the interior of said fitting.

When the shut-off body 4 is rotated counterclockwise from the position shown from the top in FIG. 1b), then initially the respective stop piece 10 or 10' disengages from the respective opposite stop piece 11 or 11'. When the stop body 4 is rotated even further towards the open position, then the respective stop piece 10 or 10' contacts the respective other stop piece 11 or 11', which defines the optimum open position. Thus, a rotation limiter device for defining the closed position and a rotation limiter device for defining the open position is implemented with simple means in the interior of the housing 2 of the shut-off valve 1.

The invention claimed is:

1. A shut-off valve for plumbing applications for shutting off a duct through which a fluid can flow, comprising:
    at least two connection fittings forming a housing, which define a flow path when assembled; and
    a shut-off body rotatably disposed in the housing, said shut-off body comprising at least two shut-off sections;
    wherein the shut-off body is movable between a closed position, in which at least one of the at least two shut-off sections of the shut-off body blocks the flow path, and an open position, in which the flow path is not blocked,
    wherein the shut-off body is formed from sheet metal,
    wherein the shut-off valve includes at least one rotation limiter device,
    wherein the rotation limiter device comprises
    a stop component integrally formed from sheet metal as part of the shut-off body, said stop component being disposed within the housing, and
    an opposite stop component also disposed within the housing for interacting with said stop component and thereby limiting the rotation of the shut-off body, and
    wherein the stop component includes a hook shaped portion that contacts the opposite stop component when the shut-off body is in the closed position.

2. The shut-off valve according to claim 1, wherein the shut-off body is at least partially one of spherical, conical and cylindrical in cross-section, and wherein the shut-off sections are non-planar.

3. The shut-off valve according to claim 2, wherein the shut-off body is in the form of a ball with at least one flattened section.

4. The shut-off valve according to claim 1, wherein the shut-off sections have a wall thickness that is constant.

5. The shut-off valve according to claim 1, wherein the shut-off body is produced through stamping and bending.

6. The shut-off valve according to claim 1, wherein the shut-off body is assembled from plural formed parts, and wherein the plural formed parts are produced through stamping and bending.

7. The shut-off valve according to claim 1, wherein the opposite shut-off component is formed by a protruding bolt shaped housing section that is an integral component of the housing.

8. The shut-off valve according to claim 1, wherein at least one of the stop component and the opposite stop component does not protrude into the flow path.

9. The shut-off valve according to claim 1, wherein the connection fittings are inserted into one another and pressed together in an overlapping portion through cold forming.

10. The shut-off valve according to claim 9, wherein a seal ring is disposed in the overlapping portion between the connection fittings inserted into one another.

* * * * *